United States Patent
Jensen et al.

(10) Patent No.: US 10,046,267 B2
(45) Date of Patent: Aug. 14, 2018

(54) DEHUMIDIFIER SYSTEM FOR REGENERATING A DISSICANT WHEEL BY MEANS OF STEAM AND A DEHUMIDIFIER COMPRISING SAID SYSTEM

(71) Applicant: Cotes A/S, Slagelse (DK)

(72) Inventors: Ebbe Nørgaard Jensen, Højbjerg (DK); Thomas Rønnow Olesen, Århus C (DK)

(73) Assignee: Cotes A/S, Slagelse (DK)

( * ) Notice: Subject to any disclaimer, the term of this patent is extended or adjusted under 35 U.S.C. 154(b) by 0 days.

(21) Appl. No.: 15/033,759

(22) PCT Filed: Oct. 31, 2014

(86) PCT No.: PCT/EP2014/073492
§ 371 (c)(1),
(2) Date: May 2, 2016

(87) PCT Pub. No.: WO2015/063279
PCT Pub. Date: May 7, 2015

(65) Prior Publication Data
US 2016/0250583 A1    Sep. 1, 2016

(30) Foreign Application Priority Data
Nov. 1, 2013  (DK) .................................. 2013 00625

(51) Int. Cl.
*B01D 53/06*   (2006.01)
*F24F 3/14*    (2006.01)
*B01D 53/26*   (2006.01)

(52) U.S. Cl.
CPC ........... *B01D 53/06* (2013.01); *B01D 53/261* (2013.01); *F24F 3/1423* (2013.01);
(Continued)

(58) Field of Classification Search
CPC  B01D 53/06; B01D 53/261; B01D 2253/104; B01D 2253/106;
(Continued)

(56) References Cited

U.S. PATENT DOCUMENTS 4,926,618 A * 5/1990 Ratliff .................... B01D 53/06
                                                    95/10
5,758,508 A * 6/1998 Belding ............... B01D 53/261
                                                    62/271

(Continued)

FOREIGN PATENT DOCUMENTS

EP         0014895 A1   9/1980
WO     2008044932 A1   4/2008

OTHER PUBLICATIONS

International Search Report for International Application No. PCT/EP2014/073492, dated Nov. 3, 2015, 2 pages.

*Primary Examiner* — Frank Lawrence
(74) *Attorney, Agent, or Firm* — Ziegler IP Law Group, LLC

(57) ABSTRACT

The present invention relates to systems for regenerating desiccants wheels using superheated steam and to a dehumidifier comprising a system for regenerating a desiccant wheel using superheated steam. In particular the invention relates to dehumidifier systems and dehumidifiers comprising such dehumidifier systems, the dehumidifier systems each comprising a closed regeneration loop for regenerating a rotary desiccant wheel using superheated steam; and uses of excess superheated steam generated during regeneration.

14 Claims, 5 Drawing Sheets

(52) U.S. Cl.
CPC .. *B01D 2253/104* (2013.01); *B01D 2253/106* (2013.01); *B01D 2253/108* (2013.01); *B01D 2259/4009* (2013.01); *B01D 2259/65* (2013.01); *F24F 2003/1464* (2013.01); *F24F 2203/1032* (2013.01)

(58) Field of Classification Search
CPC ...... B01D 2253/108; B01D 2259/4009; B01D 2259/65; F24F 3/1423; F24F 2003/1464; F24F 2203/1032
USPC ..... 95/113, 117–126; 96/125–128, 131, 145; 34/472, 473, 80
See application file for complete search history.

(56) References Cited

U.S. PATENT DOCUMENTS

| | | | |
|---|---|---|---|
| 6,478,855 B1* | 11/2002 | Okano | F24F 3/1411 95/113 |
| 2005/0235827 A1 | 10/2005 | Dinnage et al. | |
| 2006/0117780 A1* | 6/2006 | Chin | F24F 3/1411 62/271 |
| 2007/0028769 A1* | 2/2007 | Eplee | B01D 53/06 95/113 |
| 2009/0139254 A1* | 6/2009 | Landry | B01D 5/0033 62/271 |
| 2009/0223236 A1* | 9/2009 | Call | F24F 3/1423 62/235.1 |
| 2010/0031528 A1* | 2/2010 | Akkerman | F24F 3/1423 34/472 |
| 2010/0275775 A1* | 11/2010 | Griffiths | B01D 53/0454 95/18 |

\* cited by examiner

DEHUMIDIFIER SYSTEM FOR REGENERATING A DISSICANT WHEEL BY MEANS OF STEAM AND A DEHUMIDIFIER COMPRISING SAID SYSTEM

FIELD

The present invention relates to systems for regenerating desiccants wheels using superheated steam and to a dehumidifier comprising a system for regenerating a desiccant wheel using superheated steam.

BACKGROUND

In many industrial processes it is desirable to contact dry air with chemicals or food produce to manufacture dried substances, e.g. in convective dryers. In order to produce dry air it is a common method to pass intake air from the surroundings through an adsorption dehumidifier thereby removing excess moisture from the intake air.

Adsorption dehumidifiers, e.g. desiccant dehumidifiers, remove water from a volume of air that passes through it. The heart of this process could be an adsorption rotor made from or coated with a special substance that absorbs the water molecules that make up the moisture in the passing air.

As the rotor absorbs water it becomes necessary to remove absorbed water in order to regain the adsorption capability of the rotor. In order to remove the humidity in the rotor, the rotor is rotated over to a regeneration zone, where it is dried with heated air. The warm, humid regeneration air is led out, and the rotor is once again ready to absorb water molecules. This operation can be continuous or stepwise.

In recent years an increased focus on process economics has led to improvements in dehumidifier designs focusing amongst other elements on the reuse of the energy content of the warm and humid regeneration air rather than merely discarding it to the atmosphere.

It is an aim of the present invention to suggest an improved system for regenerating a desiccant wheel wherein the regeneration air in the form of superheated steam is used for further purposes in a process stream associated with the desiccant wheel.

U.S. Pat. No. 3,183,649 describes a dehumidifier system comprising a rotary desiccant wheel which comprises a first means to supply a supply gas to an adsorption section of the desiccant wheel, second means to supply superheated steam to a regeneration section of the desiccant wheel, and a third means to supply a flush gas to a flush section.

EP 0014895 discloses an apparatus for producing liquid water from moisture in the air by adsorbing the moisture on an adsorbent and then desorbing water 5 from the adsorbent by heating it and condensing steam into liquid water. The water producing apparatus comprises a recycling passage for recycling steam through an adsorbent column in the desorbing step, a heater for heating the steam in the recycling passage; and a condenser branched from the recycling 10 passage. In the desorbing step, steam in the recycling passage is heated by the heater to heat the adsorbent and to desorb water from the adsorbent and excess of steam corresponding to the desorbed steam is passed from the recycling passage to the branched condenser and is condensed to obtain liquid water in high efficiency.

WO 2008/044932 describes a dehumidifier system comprising a zeolite rotary desiccant wheel which comprises a first means to supply a supply gas to an adsorption section of the desiccant wheel, a second means to supply superheated steam to a regeneration section of the desiccant wheel, and a third means to supply a flush gas to a flush section, whereby each of the first, second and third means comprises a ventilator or compressor. In an embodiment of the invention of the prior art the superheated steam circulates the zeolite rotary desiccant wheel in a closed-loop regeneration system thus creating an ever increasing surplus of steam with each regeneration cycle. In order to dispose of the surplus moisture the inventors of WO 2008/044932 suggest passing the excess of superheated steam through a heat exchanger to preheat the supply gas intended to be dried in the zeolite rotary desiccant wheel. Thereby, however, energy needed to maintain the temperature of the superheated steam is lost from the closed regeneration loop. FIG. 1 shows the dehumidifier of the prior art.

An advantage to the use of zeolite rotary desiccant wheels with superheated steam is given by the adsorption properties of zeolites at the high temperatures. However the regeneration of zeolite rotary desiccant wheels are less efficient unless steam temperatures in excess of 200° C. are used for regenerating the zeolite rotary desiccant wheel as the adsorption capacity of zeolites do not fall significantly below 5 wt % adsorbed water at lower temperatures. This increases energy consumption for heating the superheated steam to an adequate operating temperature, which can be difficult to maintain in an operating environment and heat loss from the regeneration flow path may be significant. Further such high operating temperatures also require heating of any supply gas entering the desiccant wheel in order not to cool the zeolite desiccant wheel below an efficient operating temperature for the intended steam recovery. Thereby a part of the energy advantage of using superheated steam for regeneration of a zeolite rotary desiccant wheel is lost.

It is an aspect of the present invention to improve the energy efficiency of the systems of the prior art by suggesting further uses for the excess of superheated steam generated in a closed-loop regeneration system based on superheated steam. It is further an aspect of the present invention to present an improved dehumidifier system for use with other rotary desiccant wheels besides zeolites, preferably rotary desiccant wheels for silica gels and/or activated alumina.

In one aspect, the present invention therefore relates to the regeneration of a silica gel rotary desiccant wheel using a closed-loop regeneration system based on superheated steam wherein excess superheated steam and energy generated during regeneration of the desiccant wheel is used in further energy requiring processes within the environment wherein the dehumidifier system of the present invention is installed. Thereby the superior absorption ability for water of silica gel or activated alumina desiccants used in rotary desiccant wheels can be combined with a closed-loop superheated steam recovery of such rotary desiccant wheels at lower operating temperatures and an increase energy gain from the regeneration process.

BRIEF DESCRIPTION OF THE INVENTION

In a first aspect of the present invention there is disclose a dehumidifier system (200,300,400) and a dehumidifier comprising said dehumidifier system (200,300,400), said dehumidifier system (200,300,400) comprising a rotary desiccant wheel (210); a supply gas flow path (220) for supplying a supply gas to an adsorption section (211) of said rotary desiccant wheel (210) defining thereby an upstream side (221) and a front side (215) of said rotary desiccant wheel (210), and a downstream side (222) and a backside (216) of said rotary desiccant wheel (210); and a closed regeneration loop (240,340,440) for regenerating said rotary desiccant wheel (210) using superheated steam; and said closed regeneration loop (240,340,440) comprising at least one means for circulating superheated steam (250,350,450) in said closed regeneration loop (240,340,440), at least one steam superheater (260,360,460), and at least one diversion flow path (270,370,470) for diverting a flow of excess superheated steam from said closed regeneration loop (240, 340,440) to at least one process element of interest (280), said at least one process element of interest (280,380,480) configured to transform excess energy stored in said flow of excess superheated steam into work or heating or cooling or a combination thereof; with the proviso that when said rotary desiccant wheel is a zeolite rotary desiccant wheel, said at least one process element of interest is not a heat exchanger for heating a supply gas arranged in a flow path for a supply gas upstream of said zeolite rotary desiccant wheel.

In a first embodiment of the first aspect there is disclosed a dehumidifier system (200,300,400) and a dehumidifier comprising said dehumidifier system (200,300,400), wherein the flow direction of said superheated steam is countercurrent to the flow direction of said supply gas, wherefore said superheated steam circulating in said closed regeneration loop (240,340,440) will reach a regeneration section (214) of said rotary desiccant wheel (210) from said backside (216) of said rotary desiccant wheel.

In a second embodiment of the first aspect there is disclosed a dehumidifier system (200,300,400) and a dehumidifier comprising said dehumidifier system (200,300, 400), wherein the flow direction of said superheated steam is co-current to the flow direction of said supply gas, wherefore said superheated steam circulating in said closed regeneration loop (240,340,440) will reach a regeneration section (214) of said rotary desiccant wheel (210) from said front side (215) of said rotary desiccant wheel.

In a third embodiment of the first aspect there is disclosed a dehumidifier system (200,300,400) and a dehumidifier comprising said dehumidifier system (200,300,400) according to any preceding embodiments, further comprising a flush and heating flow path (230) for supplying a first flush gas to a flush and heating section (212) of said rotary desiccant wheel (210) and/or a flush and cooling flow path (235) for supplying a second flush gas to a flush and cooling section (212) of said rotary desiccant wheel (210);

In a fourth embodiment of the first aspect there is disclosed a dehumidifier system (200,300,400) and a dehumidifier comprising said dehumidifier system (200,300,400) according to any preceding embodiments, wherein said first flush gas and said second flush gas are the same, preferably the same as said supply gas.

In a fifth embodiment of the first aspect there is disclosed a dehumidifier system (200,300,400) and a dehumidifier comprising said dehumidifier system (200,300,400) according to any preceding embodiments, wherein said flush and heating flow path (230), and said flush and cooling flow path (235), are connected to form a unified flush flow path (236,237,336,337,436,437); preferably connected to form a unified flush flow path either upstream (237,337,437) from said rotary desiccant wheel (210) and/or downstream (236, 336,436) from said rotary desiccant wheel.

In a sixth embodiment of the first aspect there is disclosed a dehumidifier system (200,300,400) and a dehumidifier comprising said dehumidifier system (200,300,400) according to any preceding embodiments, comprising at least one further flush and heating flow path (230) and/or at least one further flush and cooling flow path (235).

In a seventh embodiment of the first aspect there is disclosed a dehumidifier system (200,300,400) and a dehumidifier comprising said dehumidifier system (200,300,400) according to any preceding embodiments, wherein said rotary desiccant wheel (210) comprises a silica gel, a zeolite, an activated alumina, preferably a silica gel or an activated alumina, more preferably a silica gel.

In an eight embodiment of the first aspect there is disclosed a dehumidifier system (200,300,400) and a dehumidifier comprising said dehumidifier system (200,300,400) according to any preceding embodiments, wherein said rotary desiccant wheel (210) comprises a combination of adsorbents, preferably of silica gel and zeolite as a mixture; or as alternating layers of two or more of said adsorbents, preferably alternating layers of silica gel and zeolite.

In a ninth embodiment of the first aspect there is disclosed a dehumidifier system (200,300,400) and a dehumidifier comprising said dehumidifier system (200,300,400) according to any preceding embodiments, wherein the regeneration operating temperature of said superheated steam is from 100° C. to 250° C., preferably from 110° C. to 200° C., most preferably from 130° C. to 150° C.

In a tenth embodiment of the first aspect there is disclosed a dehumidifier system (200,300,400) and a dehumidifier comprising said dehumidifier system (200,300,400) according to any preceding embodiments, wherein the regeneration operating steam pressure of said superheated steam is from 1 bar to 5 bars, preferably from 1 bar to 3 bars, more preferably from 1 bar to 2 bars, most preferable from 1.05 bars to 1.5 bars.

In an eleventh embodiment of the first aspect there is disclosed a dehumidifier system (200,300,400) and a dehumidifier comprising said dehumidifier system (200,300,400) according to any preceding embodiments, wherein said at least one process element of interest (280,380,480) is a heat exchanger (380) or a heat driven cooling unit (480).

In a twelfth embodiment of the first aspect there is disclosed a dehumidifier system (200,300,400) and a dehumidifier comprising said dehumidifier system (200,300,400) according to any preceding embodiments, wherein said rotating desiccant wheel comprises silica gel and/or activated alumina and said dehumidifier system is operated at a regeneration operation temperature between 110° C. to 200° C., more preferably operated at a regeneration operation temperature between 120° C. to 180° C., most preferably from 130° C. to 150° C.

In a thirteenth embodiment of the first aspect there is disclosed a dehumidifier system (200,300,400) and a dehumidifier comprising said dehumidifier system (200,300,400) according to any preceding embodiments, wherein the temperature of said supply gas upon entry into said rotary desiccant wheel (210) is from 5° C. to 100° C., preferably from 10° C. to 60° C., preferably from 20° C. to 50° C., preferably from 30° C. to 40° C.

In a fourteenth embodiment of the first aspect there is disclosed a dehumidifier system (200,300,400) and a dehumidifier comprising said dehumidifier system (200,300,400) according to any preceding embodiments, further comprising at least one underpressure section (590,591,592,593, 594).

In a fifteenth embodiment of the first aspect there is disclosed a dehumidifier system (200,300,400) and a dehumidifier comprising said dehumidifier system (200,300,400) according to any preceding embodiments, wherein excess superheated steam from said closed regeneration loop (340)

for superheated steam regeneration of said rotary desiccant wheel (210) is diverted from said closed regeneration loop (340) along said diversion flow path (370) to said at least one process element of interest (380), said at least one process element of interest (380) being a heat exchanger (380), preferably a condenser, comprised in said closed regeneration loop (340), preferably said heat exchanger (380) arranged in said closed regeneration loop (340) between said at least one means for circulating superheated steam (350) and said steam superheater (360).

In a sixteenth embodiment of the first aspect there is disclosed a dehumidifier system (300) and a dehumidifier comprising said dehumidifier system (300) according to the fifteenth embodiment of the first aspect, further comprising in said diversion flow path (370) at least one compressor (381) for compressing in at least on compression step said excess superheated steam prior to entering said heat exchanger (380).

In a seventeenth embodiment of the first aspect there is disclosed a dehumidifier system (200,300,400) and a dehumidifier comprising said dehumidifier system (200,300,400) according to any preceding embodiments, wherein excess superheated steam from a closed regeneration loop (440) for superheated steam regeneration of a rotary desiccant wheel (210) is diverted from said closed regeneration loop (440) along a diversion flow path (470) to at least one heat driven cooling unit (480a,480b) located either upstream (480a) or downstream (480b) of said rotary desiccant wheel (210) in a gas flow path (220,230,235), preferably located in said supply gas flow path (220).

In an eighteenth embodiment of the first aspect there is disclosed a dehumidifier system, said dehumidifier system comprising a first dehumidifier system (200,300,400), said first dehumidifier system (200,300,400) comprising a closed regeneration loop (240,340,440) for regenerating a rotary desiccant wheel (210) using superheated steam according to any of the preceding embodiments, and at least a second dehumidifier system, said second dehumidifier system comprising at least one second rotary desiccant wheel, said at least one second dehumidifier system not comprising a closed regeneration loop for regenerating said at least one second rotary desiccant wheel using superheated steam, wherein said first dehumidifier system (200,300,400) and said at least a second dehumidifier system are arranged sequentially on said supply gas flow path (220), preferably arranged sequentially with said first dehumidifier system (200,300,400) arranged upstream (221) of said at least a second dehumidifier system on said supply gas flow path (220).

DETAILED DESCRIPTION

The present invention relates to novel dehumidifier systems and novel dehumidifiers comprising said novel dehumidifier systems, each comprising a closed regeneration loop for regenerating a rotary desiccant wheel using superheated steam; and uses of excess superheated steam generated during regeneration.

Figure 1:
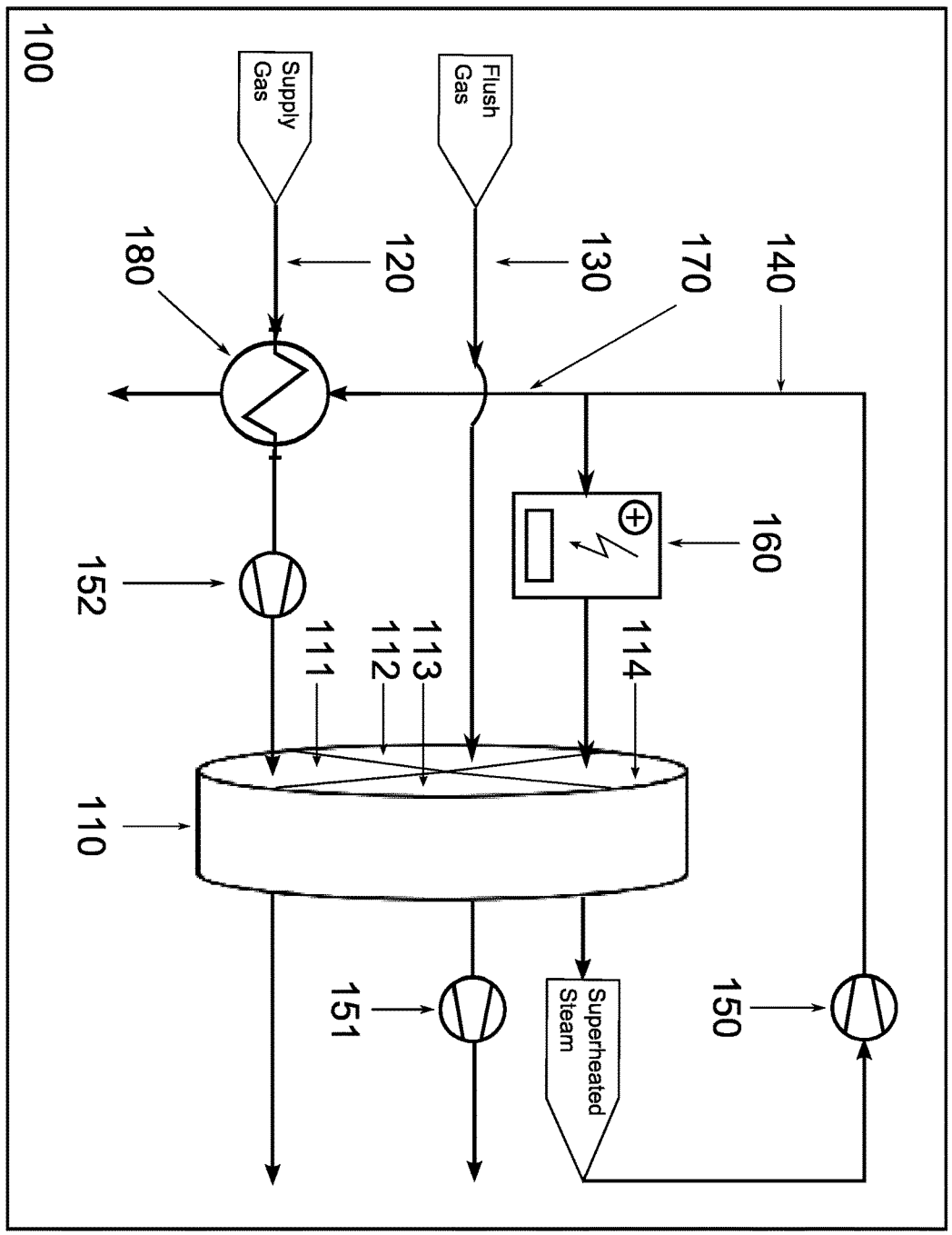
FIG. 1: A dehumidifier system of the prior art.

FIG. 1 details the layout of a prior art dehumidifier system (100) comprising a zeolite rotary desiccant wheel (110) and a closed regeneration loop (140) for regenerating said zeolite rotary desiccant wheel using superheated steam; said dehumidifier system (100) further comprising a flow path (120) for a supply gas, a first means (152) for supplying said supply gas to an adsorption section (111) of said zeolite rotary desiccant wheel (110), said first means (152) arranged upstream of said zeolite rotary desiccant wheel (110) in said flow path (120) for said supply gas; a flow path (130) for a flush gas, a third means (151) for supplying said flush gas to a first flush section (112) of said zeolite rotary desiccant wheel (110) for cooling said zeolite rotary desiccant wheel, said third means (151) arranged downstream of said zeolite rotary desiccant wheel (110) in said flow path (130) for a flush gas; said closed regeneration loop (140) comprising a superheater (160), a second means (150) for circulating said superheated steam in said closed regeneration loop, and a diversion flow path (170) for diverting a flow of excess superheated steam from said closed regeneration loop (140) to a heat exchanger (180), said heat exchanger (180) arranged in said flow path (120) for said supply gas upstream of said zeolite rotary desiccant wheel (110), said heat exchanger (180) thereby heating said supply gas, and wherein each of said first, second and third means comprise a ventilator or compressor, and wherein said supply gas and said flush gas are filtered by separate filters prior to passage through the said zeolite rotary desiccant wheel (110). It is contemplated that the dehumidifier system of the prior art is operated at an operating temperature of the superheated steam between 110° C. to 250° C.

It is the aim of the present invention to improve on the dehumidifier and dehumidifier system of the prior art, in particular by providing novel dehumidifier systems and dehumidifiers comprising silica gel rotary desiccant wheels and a closed regeneration loop for regenerating a silica gel rotary desiccant wheel using superheated steam, and further by providing uses of excess superheated steam generated during regeneration in rotary desiccant wheels, in particular providing further uses of excess energy stored in said excess superheated steam. In the context of the present invention excess energy is to be understood as the amount of energy stored in said excess of superheated steam that can be recovered in further energy consuming processes downstream of said closed regeneration loop such as e.g. kinetic energy recovered in a turbine or latent heat, e.g. latent heat of condensation, recovered in e.g. a heat exchanger or a heat driven cooling unit. The total amount of excess energy of the excess superheated steam equals the exergy of the excess superheated steam.

Figure 2:
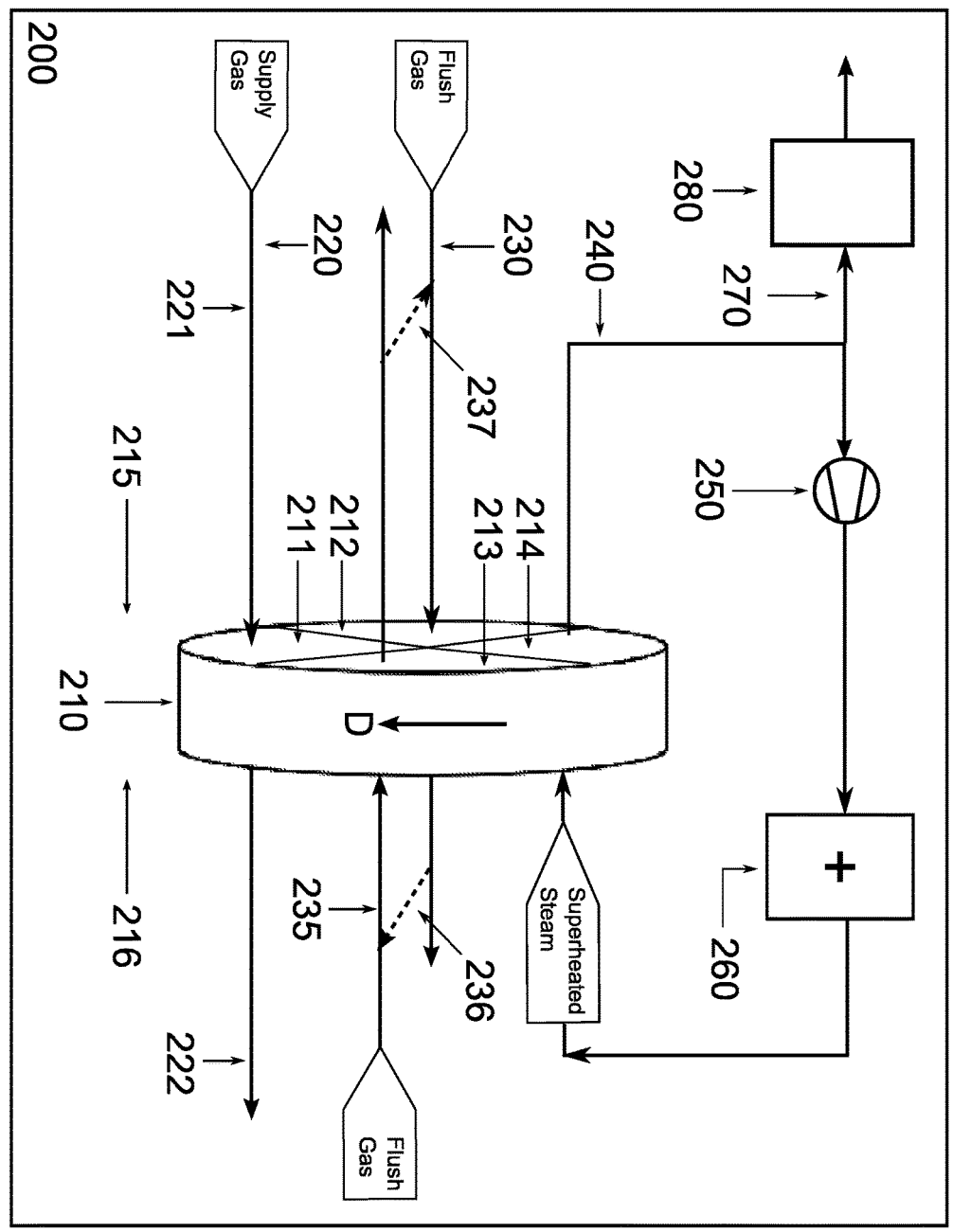
FIG. 2: An exemplary dehumidifier system according to the invention.

FIG. 2 details an exemplary dehumidifier system (200) according to the present invention.

The dehumidifier and dehumidifier system (200) of the present invention comprises a rotary desiccant wheel (210). The rotary desiccant wheel (210) revolves during operation either continuously or stepwise in a direction D indicated by the arrow on the wheel, thereby defining a rotary direction D. In the Figure, the direction of rotation is clockwise, but this is not important to the invention and a counter-clockwise rotation is fully within the scope of the invention. The rotary desiccant wheel (210) is partitioned into a subset of sections at least comprising an adsorption section (211) for adsorbing moisture contained in a supply gas and a regeneration section (214), preferably at least comprising four subsections (211,212,213,214), these at least four subsections comprising an adsorption section (211) for adsorbing moisture contained in a supply gas, a flush and heating section (212), a regeneration section (214), and a flush and cooling section (213), said subsections preferably arranged, as listed, sequentially on said rotary desiccant wheel (210) in the direction of rotation D. In some applications, a further subdivision of these subsections may be advantageous; however, for clarity of disclosure the present invention is disclosed in terms of the preferred embodiment comprising at least four subsections (211,212,213,214).

The present invention is not limited by any particular choice in adsorbent comprised in said rotary desiccant wheel (210). However, it is contemplated that preferably the adsorbent comprised in said rotary desiccant wheel (210) can be a silica gel, a zeolite, an activated alumina, preferably a silica gel or an activated alumina, more preferably a silica gel. In some embodiments the adsorbent comprised in said rotary desiccant wheel may comprise a combination of adsorbents, preferably of silica gel and zeolite. In some applications it will be advantageous to construct said rotary desiccant wheel (210) with alternating layers of two or more of said adsorbents, preferably alternating layers of silica gel and zeolite.

In this context, and throughout the present text, the invention is described for simplicity in terms of adsorption. The skilled person will know, however, that depending on the actual choice of desiccant, or combinations of desiccants, the rotary desiccant wheel (210) described above may adsorb but could also e.g. absorb or chemisorb. The actual mode of interaction between adsorbent and moisture is not considered limiting on the present invention.

The dehumidifier system (200) further comprises a supply gas and a supply gas flow path (220), enabling said supply gas to traverse said dehumidifier system along said supply gas flow path. The supply gas traversing the dehumidifier system (200) along said supply gas flow path (220) will reach said rotary desiccant wheel (210) at an adsorption section (211) of said rotary desiccant wheel, thereby defining an upstream side (221) of said rotary desiccant wheel and a front side (215) of said rotary desiccant wheel; and will exit said rotary desiccant wheel (210) from said adsorption section (211) opposite of said front side, thereby defining a downstream side (222) of said rotary desiccant wheel and a backside (216) of said rotary desiccant wheel. By traversing said rotary desiccant wheel, the moisture content of said supply gas is lowered.

The dehumidifier system (200) may also comprise a flush and heating flow path (230), enabling a first flush gas to traverse said dehumidifier system (200) while heating said rotary desiccant wheel (210) during passage of said rotary desiccant wheel (210). Said first flush gas traversing said dehumidifier system (200) along said flush and heating flow path (230) will reach said rotary desiccant wheel (210) at a flush and heating section (212) of said rotary desiccant wheel (210), preferably reach said rotary desiccant wheel (210) on said front side (215) of said rotary desiccant wheel (210), traverse said rotary desiccant wheel (210) whilst heating said rotary desiccant wheel (210), itself thereby becoming colder. In some embodiments the dehumidifier system (200) of the present invention may comprise more than one flush and heating flow path (230) and said rotary desiccant wheel (210) may comprise more than one flush and heating section (212).

The dehumidifier system (200) may also comprise a flush and cooling flow path (235), enabling a second flush gas to traverse said dehumidifier system (200) while cooling said rotary desiccant wheel (210) during passage of said rotary desiccant wheel (210). Said second flush gas traversing said dehumidifier system (200) along said flush and cooling flow path (235) will reach said rotary desiccant wheel (210) at a flush and cooling section (213) of said rotary desiccant wheel (210), preferably reach said rotary desiccant wheel (210) on said backside (216) of said rotary desiccant wheel (210), traverse said rotary desiccant wheel (210) whilst cooling said rotary desiccant wheel (210), itself thereby becoming warmer. In some embodiments the dehumidifier system (200) of the present invention may comprise more than one flush and cooling flow path (235) and said rotary desiccant wheel (210) may comprise more than one flush and cooling section (213).

The dehumidifier system (200) of the present invention also comprises a closed regeneration loop (240) for regenerating said rotary desiccant wheel (210) using superheated steam. Said closed regeneration loop (240) comprises at least one means for circulating superheated steam (250) in said closed regeneration loop (240), preferably said at least one means for circulating superheated steam (250) is a ventilator or compressor, at least one steam superheater (260), and at least one diversion flow path (270) for diverting a flow of excess superheated steam from said closed regeneration loop (240) to at least one process element of interest (280), said at least one process element of interest (280) configured to transform excess energy stored in said flow of excess superheated steam into work or heating or cooling or a combination thereof. Preferably, said at least one process element of interest (280) is a heat exchanger or a heat driven cooling unit.

During operation of the dehumidifier system (200) of the present invention, the flow direction of the superheated steam is countercurrent to the flow direction of the supply gas, wherefore the superheated steam circulating in said closed regeneration loop (240) will reach said regeneration section (214) of said rotary desiccant wheel (210) from said backside (216) of said rotary desiccant wheel. In some applications, however, the flow direction of the superheated steam is co-current to the flow direction of the supply gas, wherefore the superheated steam circulating in said closed regeneration loop (240) will reach said regeneration section (214) of said rotary desiccant wheel (210) from said front side (215) of said rotary desiccant wheel.

Upon traversing said regeneration section (214) of said rotary desiccant wheel (210) said superheated steam will absorb moisture from said rotary desiccant wheel and become colder. The presence of the at least one steam superheater (260) in said closed regeneration loop (240) serves to reheat said superheated steam to a desired regeneration operating temperature. The presence of the at least one ventilator or compressor (250) serves to maintain circulation of said superheated steam in said closed regeneration loop (240) whilst maintaining a regeneration operating steam pressure. Preferably, on said closed regeneration loop (240) said at least one ventilator of compressor (250) is located before said at least on steam superheater (260).

The regeneration operating temperature of said superheated steam is from 100° C. to 250° C., preferably from 105° C. to 200° C., more preferably from 110° C. to 175° C., even more preferably from 110° C. to 150° C. and most preferable from 115° C. to 130° C. Preferably the regenerating operating temperature of said superheated steam is measured at a point on said closed regeneration loop (240) after said steam superheater (260) but prior to entry into said regeneration section (214) of said rotary desiccant wheel (210). It is within the competences of the skilled person in the art to device a temperature feedback loop enabling the maintenance of a desired regeneration operating temperature.

The regeneration operating steam pressure of said superheated steam is normally from 1 bar to 5 bars, preferably from 1 bar to 3 bars, more preferably from 1 bar to 2 bars, and most preferably from 1.05 bars to 1.5 bars. Preferably the regenerating operating steam pressure of said superheated steam is measured at a point on said closed regeneration loop (240) after said steam superheater (260) but prior to entry into said regeneration section (214) of said rotary desiccant wheel (210). It is within the competences of the skilled person in the art to device a pressure feedback loop enabling the maintenance of a desired regeneration operating steam pressure.

Preferably, the temperature of said supply gas upon entry into said rotary desiccant wheel (210) is from 5° C. to 100° C., preferably from 10° C. to 60° C., preferably from 20° C. to 50° C., preferably from 30° C. to 40° C. Preferably it traverses said dehumidifier system (200) and said dehumidifier comprising said dehumidifier system (200) at a pressure which is larger than said regeneration operating pressure.

Accordingly, the present invention concerns in a particular embodiment a dehumidifier system (200) and a dehumidifier comprising said dehumidifier system (200), said dehumidifier system (200) comprising a rotary desiccant wheel (210); a supply gas flow path (220) for supplying a supply gas to an adsorption section (211) of said rotary desiccant wheel (210) defining thereby an upstream side (221) and a front side (215) of said rotary desiccant wheel (210), and a downstream side (222) and a backside (216) of said rotary desiccant wheel (210); a flush and heating flow path (230) for supplying a first flush gas to a flush and heating section (212) of said rotary desiccant wheel (210); a flush and cooling flow path (235) for supplying a second flush gas to a flush and cooling section (212) of said rotary desiccant wheel (210); and a closed regeneration loop (240) for regenerating said rotary desiccant wheel (210) using superheated steam, wherein the flow direction of said superheated steam is countercurrent to the flow direction of said supply gas, wherefore said superheated steam circulating in said closed regeneration loop (240) will reach a regeneration section (214) of said rotary desiccant wheel (210) from said backside (216) of said rotary desiccant wheel, said closed regeneration loop (240) comprising at least one means for circulating superheated steam (250) in said closed regeneration loop (240), at least one steam superheater (260), and wherein said closed regeneration loop (240) further comprises at least one flow path (270) for directing a flow of excess superheated steam from said closed regeneration loop (240) to at least one process element of interest (280), said at least one process element of interest (280) configured to transform excess energy stored in said flow of excess superheated steam into work or heating or cooling or a combination thereof; with the proviso that when said rotary desiccant wheel is a zeolite rotary desiccant wheel, said at least one process element of interest is not a heat exchanger for heating a supply gas arranged in a flow path for a supply gas upstream of said zeolite rotary desiccant wheel. Preferably, said at least one process element of interest (280) is a heat exchanger or a heat driven cooling unit.

In an embodiment of the dehumidifier system (200) and a dehumidifier comprising said dehumidifier system (200), said first flush gas and said second flush gas are the same, preferably the same as said supply gas. In an embodiment thereof, a part of said supply gas is directed from said supply gas flow path (220) downstream (222) of said rotary desiccant wheel (210) into said flush and heating flow path (230) or into said flush and cooling flow path (235) to serve as said first or second flush gasses respectively.

In a further embodiment said flush and heating flow path (230), and said flush and cooling flow path (235), are connected to form a unified flush flow path (236,237); preferably connected to form a unified flush flow path either upstream (237) from said rotary desiccant wheel (210) and/or downstream (236) from said rotary desiccant wheel.

In a further and preferred embodiment of said dehumidifier system (200) and a dehumidifier comprising said dehumidifier system (200), said rotating desiccant wheel comprises silica gel and/or activated alumina. Preferably said dehumidifier system (200) and a dehumidifier comprising said dehumidifier system (200), said rotating desiccant wheel comprising silica gel and/or activated alumina is operated at a regeneration operation temperature between 110° C. to 160° C., more preferably operated at a regeneration operation temperature between 130° C. to 150° C. Thereby the regeneration capacity of said superheated steam is optimized for use with silica gel and/or activated alumina as an adsorbent. The lower operating temperatures for a dehumidifier system of the present invention comprising silica gel and/or activated alumina minimizes energy losses in the closed regeneration loop (240) while maintaining the known advantages of regenerating rotary desiccant wheels using superheated steam.

In order to operate the dehumidifier system (200) and a dehumidifier comprising the dehumidifier system of the present invention, the skilled person will know to employ means for moving gasses, such as e.g. ventilators or compressors, know to employ means for filtering, such as e.g. filters, for filtering supply or flush gasses or other means for operating a dehumidifier system or dehumidifier as known in the art. The present invention is not limited by such further means of operating a dehumidifier system or dehumidifier. The skilled person also knows to construct a flow path according to the invention e.g. by employing conduits or pipes.

Figure 3:
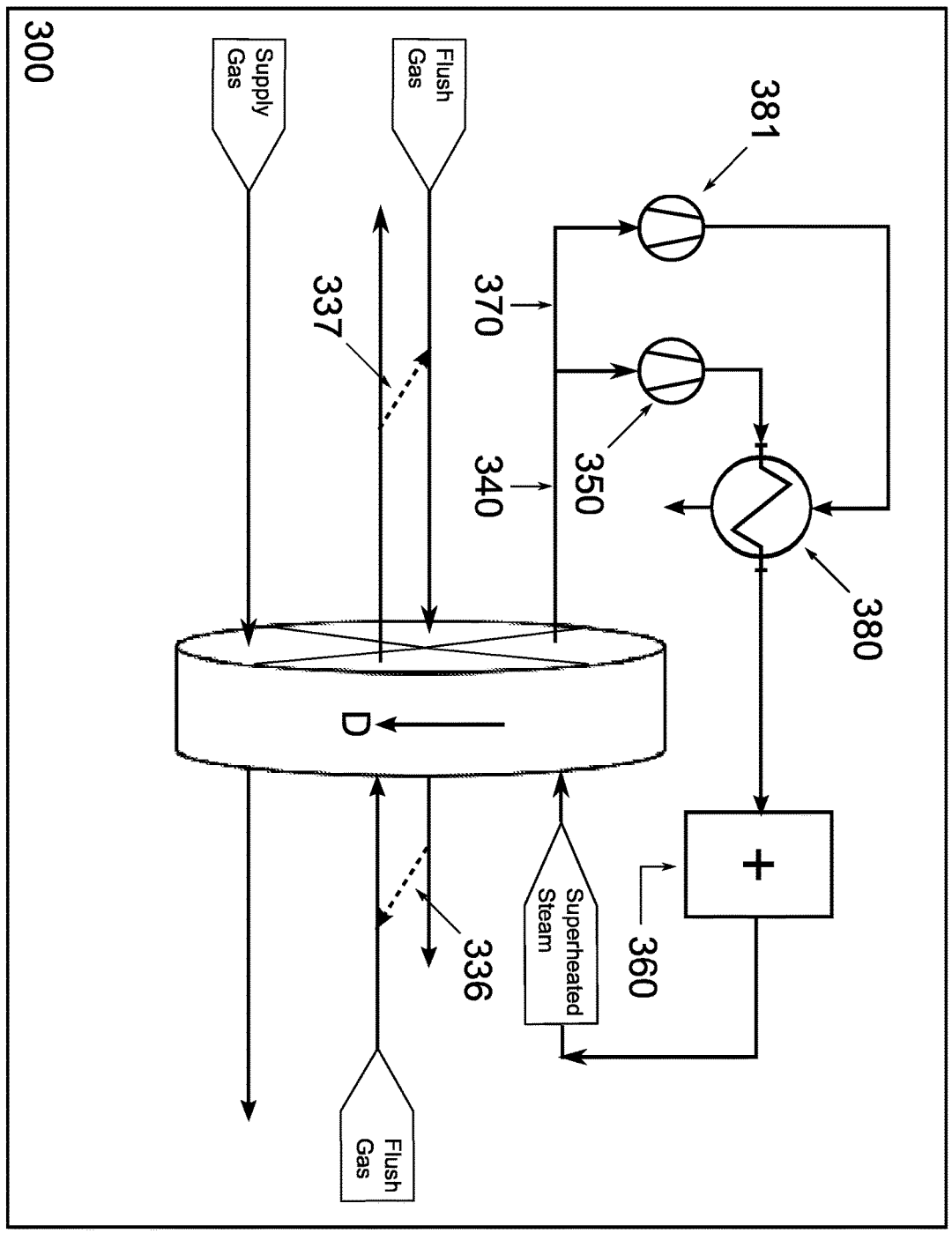
FIG. 3: An exemplary dehumidifier system for recovering latent heat of evaporation.

FIG. 3 exemplifies a dehumidifier system (200) and a dehumidifier comprising said dehumidifier system (200) according to an advantageous embodiment (300) of the present invention. In a dehumidifier system (300) and a dehumidifier comprising said dehumidifier system (300) of the embodiment, at least a part of the latent heat of evaporation contained in said excess superheated steam is returned to said closed regeneration loop (340), thus minimizing the overall energy loss in said closed regeneration loop while at the same time disposing of the excess moisture contained in said excess superheated steam in a safe manner.

In the embodiment of the invention, excess superheated steam from a closed regeneration loop (340) for superheated steam regeneration of a rotary desiccant wheel (210) is diverted from said closed regeneration loop (340) along a diversion flow path (370) to a heat exchanger (380), preferably a condenser, comprised in said closed regeneration loop (340). Preferably said heat exchanger (380) is arranged in said closed regeneration loop (340) between said at least one means for circulating superheated steam (350) in said closed regeneration loop (340) and said steam superheater (360). It is preferable that the regeneration operating temperature of the superheated steam in this embodiment is between 100° C. to 150° C., more preferably from 105° C. to 140° C., most preferably from 110° C. to 130° C.

Optionally comprised in said diversion flow path (370) is at least one compressor (381) for compressing in at least one compression step said excess superheated steam prior to entering said heat exchanger (380). When said at least one compressor (381) is present in said diversion flow path (370) it is preferable that said excess superheated steam is compressed in said at least one compressor (381) to a pressure ratio of compressed to uncompressed steam of 1 to 10, preferably to a pressure ratio of 1.4 to 5, more preferably to a pressure ratio of 1.8 to 3, more preferable to a pressure ratio of 2 to 2.5.

In an embodiment of the dehumidifier system (300) and a dehumidifier comprising said dehumidifier system (300); said dehumidifier system comprising a diversion flow path (370) for diverting an excess of superheated steam to a heat exchanger (380), preferably a condenser, comprised in said closed regeneration loop (340); said rotary desiccant wheel (210) comprises silica gel, zeolite, or a combination of silica gel and zeolite either as a mixture or as a layered structure of alternating layers of silica gel and zeolite.

In an embodiment of the dehumidifier system (300) and a dehumidifier comprising said dehumidifier system (300); said dehumidifier system comprising a diversion flow path (370) for diverting an excess of superheated steam to a heat exchanger (380), preferably a condenser, comprised in said closed regeneration loop (340), said first flush gas and said second flush gas are the same, preferably the same as said supply gas. In a further embodiment said flush and heating flow path (230), and said flush and cooling flow path (235), are connected downstream (336) or upstream (337) from said rotary desiccant wheel (210) forming a unified flush flow path (336,337).

In an embodiment of the dehumidifier system (300) and a dehumidifier comprising said dehumidifier system (300); said dehumidifier system comprising a diversion flow path (370) for diverting an excess of superheated steam to a heat exchanger (380), preferably a condenser, comprised in said closed regeneration loop (340), said diversion flow path (370) further directs at least a part of said excess superheated steam to a heat exchanger or a heat driven refrigeration unit arranged in said flow path for a supply gas (220) downstream (222) to said rotary desiccant wheel (210).

Figure 4:
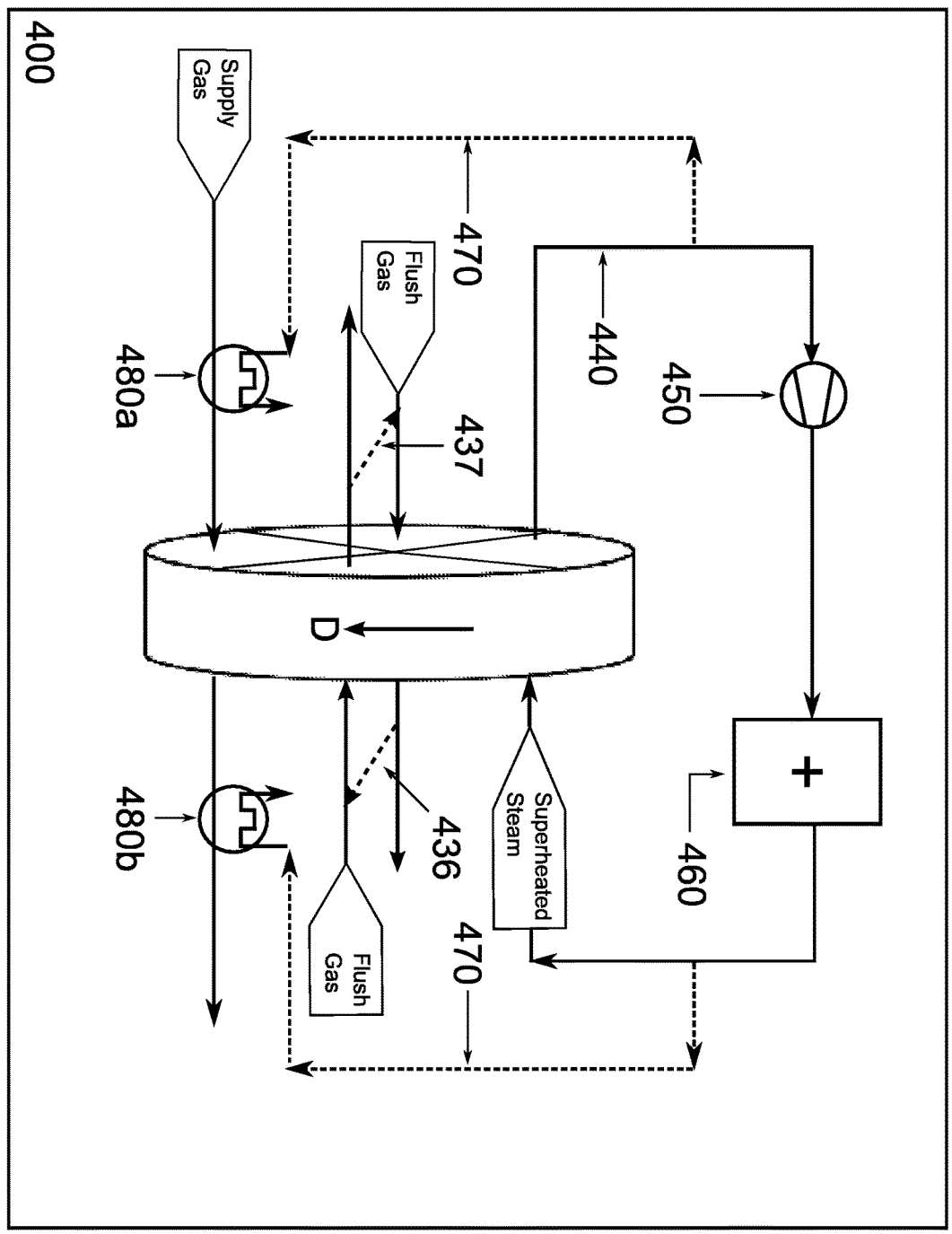
FIG. 4: An exemplary dehumidifier system comprising a heat driven refrigeration unit.

FIG. 4 exemplifies a dehumidifier system (200) and a dehumidifier comprising said dehumidifier system (200) according to another advantageous embodiment (400) of the present invention. In a dehumidifier system (400) and a dehumidifier comprising said dehumidifier system (400) of the embodiment, at least a part of the latent heat of evaporation contained in said excess superheated steam is used to enable at least one heat driven cooling unit (480a,480b) located either upstream (221) or downstream (222) of said rotary desiccant wheel (210) in a gas flow path (220,230, 235), preferably located in said supply gas flow path (220).

In the embodiment of the invention, excess superheated steam from a closed regeneration loop (440) for superheated steam regeneration of a rotary desiccant wheel (210) is diverted from said closed regeneration loop (440) along a diversion flow path (470) to at least one heat driven cooling unit (480a, 480b) located either upstream (480a) or downstream (480b) of said rotary desiccant wheel (210). It is preferable that the regeneration operating temperature of the superheated steam in this embodiment is between 130° C. to 250° C., more preferably from 140° C. to 200° C., most preferably from 150° C. to 175° C.

In an embodiment of the dehumidifier system (400) and a dehumidifier comprising said dehumidifier system (400); said dehumidifier system comprising a diversion flow path (470) for diverting an excess of superheated steam from a closed regeneration loop (440) for superheated steam regeneration of a rotary desiccant wheel (210) from said closed regeneration loop (440) along a diversion flow path (470) to at least one heat driven cooling unit (480a,480b) located either upstream (480a) or downstream (480b) of said rotary desiccant wheel (210); said rotary desiccant wheel (210) comprises silica gel, zeolite, or a combination of silica gel and zeolite either as a mixture or as a layered structure of alternating layers of silica gel and zeolite.

In an embodiment of the dehumidifier system (400) and a dehumidifier comprising said dehumidifier system (400); said dehumidifier system comprising a diversion flow path (470) for diverting an excess of superheated steam from a closed regeneration loop (440) for superheated steam regeneration of a rotary desiccant wheel (210) from said closed regeneration loop (440) along a diversion flow path (470) to at least one heat driven cooling unit (480a,480b) located either upstream (480a) or downstream (480b) of said rotary desiccant wheel (210); said first flush gas and said second flush gas are the same, preferably the same as said supply gas. In a further embodiment said flush and heating flow path (230), and said flush and cooling flow path (235), are connected downstream (436) or upstream (437) from said rotary desiccant wheel (210) forming a unified flush flow path (436,437).

The present inventors have further discovered that dehumidifier systems (200,300,400) of the present invention and dehumidifiers comprising said dehumidifier systems (200, 300,400), advantageously can be used with very humid supply gasses, in particular hot and humid supply gasses such as e.g. can be found in sub-tropical and tropical climates; wherein it is advantageous to enclose into such dehumidifier systems a further rotary desiccant wheel comprised in a further dehumidifier system downstream of said dehumidifier system (200,300,400) comprising a closed regeneration loop (240,340,440) for regenerating a rotary desiccant wheel (210) using superheated steam, and said dehumidifier comprising said dehumidifier system (200,300, 400). Also when particularly dry supply gasses having a very low dew points are wanted, such as e.g. supply gasses for use in the manufacturing of lithium batteries, will it be advantageous to combine the dehumidifier systems (200,300,400) of the present invention and dehumidifiers comprising said dehumidifier systems (200,300,400) with a further rotary desiccant wheel comprised in a further dehumidifier system downstream in the supply gas flow path.

Accordingly, the present invention in one embodiment discloses a dehumidifier system, said dehumidifier system comprising a first dehumidifier system (200,300,400), said first dehumidifier system (200,300,400) comprising a closed regeneration loop (240,340,440) for regenerating a rotary desiccant wheel (210) using superheated steam, and at least a second dehumidifier system, said second dehumidifier system comprising at least one second rotary desiccant wheel, said at least one second dehumidifier system not comprising a closed regeneration loop for regenerating said at least one second rotary desiccant wheel using superheated steam.

In particular there is disclosed a dehumidifier system, said dehumidifier system comprising a first dehumidifier system (200,300,400), said first dehumidifier system (200,300,400) comprising a closed regeneration loop (240,340,440) for regenerating a rotary desiccant wheel (210) using superheated steam according to the above embodiments, and at least a second dehumidifier system, said second dehumidifier system comprising at least one second rotary desiccant wheel, said at least one second dehumidifier system not comprising a closed regeneration loop for regenerating said at least one second rotary desiccant wheel using superheated steam, wherein said first dehumidifier system (200,300,400) and said at least a second dehumidifier system are arranged sequentially on said supply gas flow path (220), preferably arranged sequentially with said first dehumidifier system arranged upstream (221) of said at least a second dehumidifier system on said supply gas flow path (220).

In one embodiment of this further development, at least a part of said excess superheated steam generated in said closed regeneration loop (240,340,440) is diverted along said diversion flow path (270,370,470) to at least one process element of interest (280), said at least one process element of interest (280) comprised in a flow path for either a supply gas, a flush gas or a regeneration gas of said second dehumidifier system, said at least one process element of interest (280) configured to transform excess energy stored in said flow of excess superheated steam into work or heating or cooling or a combination thereof. Preferably, said at least one process element of interest (280) is a heat exchanger or a heat driven cooling unit.

A problem to the successful implementation of the present invention is to secure that superheated steam is not leaking from the regeneration section (214) to the adsorption section (211). To improve the efficiency of the flushing sections (212,213) the inventors suggest a novel improvement, not hitherto disclosed in the prior art, namely either to operate these sections at an operating flush pressure, which is lower than both the regeneration operating steam pressure and the supply gas entry pressure at entry into the rotary desiccant wheel, or to introduce specialized underpressurized sections to the rotary desiccant wheel. Thereby underpressure sections (590) are created.

Figure 5:
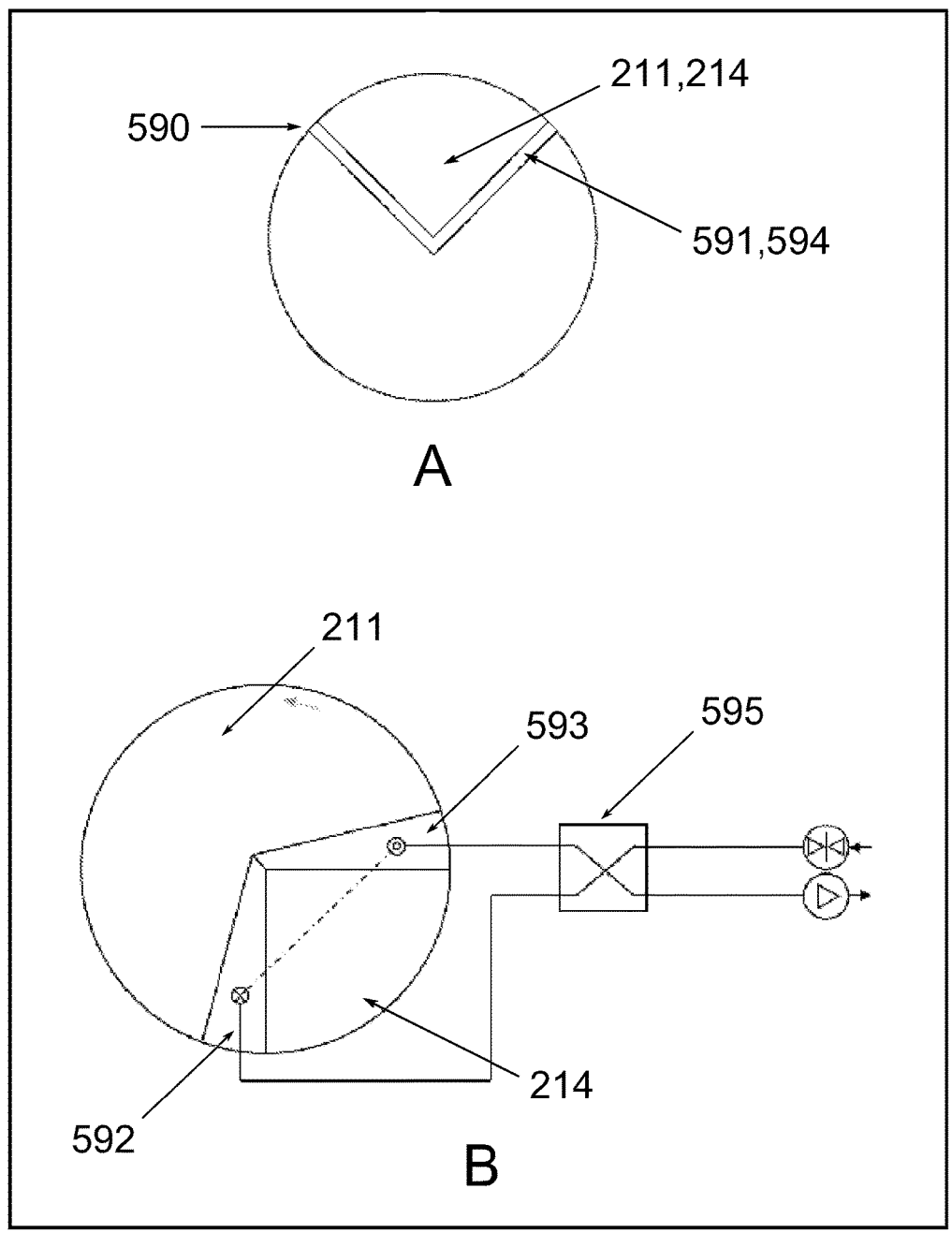
FIG. 5: An exemplary rotary desiccant wheel comprising underpressure sections.

In FIG. 5 are shown two possible implementations of such underpressure sections (590). In FIG. 5A an underpressure section (590) forming a narrow underpressure section (594) encloses said regeneration section (214), in some embodiments enclosing said regeneration section (214) between said flush and heating section (212), and said flush and cooling section (213). In a further embodiment, said underpressure section (590) forms a narrow underpressure section (591) enclosing said adsorption section (211), in some embodiments enclosing said adsorption section (211) between said flush and heating section (212), and said flush and cooling section (213).

In other embodiments (FIG. 5B), said flush and heating section (212) and/or said flush and cooling section (213) are operated underpressurized compared to said adsorption section (211), and hence become both flush and underpressure sections (592,593). In such embodiments as described in FIG. 5B it can be advantageous to employ a unified flush flow path (236,237,336,337,436,437), and when employing such a unified flush flow path, optionally coupling said flush and heating flow path (230) with said flush and cooling flow path (235) in a heat exchanger (595).

In a further embodiment, the rotary desiccant wheel (210) may be enclosed in a closed cabinet operating at an underpressure, thereby creating an underpressure cabinet and an underpressure rotary desiccant wheel. This will further, either alone or in combination with the above embodiments, help in securing that moisture will not leak from said closed regeneration loop (240,340,440) to said adsorption section (211).

In a further embodiment, the closed regeneration loop (240,340,440) is operated at a slight underpressure compared the adsorption section (211), thereby reducing or preventing moisture from leaking from said closed regeneration loop to said adsorption section. Suitable operating pressures of said closed regeneration loop may e.g. be 0.7 bar, 0.8 bar, or 0.9 bar.

The term "comprising" as used in the claims does not exclude other elements or steps. The term "a" or "an" as used in the claims does not exclude a plurality. The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. A dehumidifier system (200,300,400) comprising
a rotary desiccant wheel (210) comprising a silica gel;
a supply gas flow path (220) for supplying a supply gas to an adsorption section (211) of said rotary desiccant wheel (210) defining thereby an upstream side (221) and a front side (215) of said rotary desiccant wheel (210), and a downstream side (222) and a backside (216) of said rotary desiccant wheel (210); and
a closed regeneration loop (240,340,440) for regenerating said rotary desiccant wheel (210) using superheated steam; and
said closed regeneration loop (240,340,440) comprising
at least one means for circulating superheated steam (250,350,450) in said closed regeneration loop (240,340,440),
at least one steam superheater (260,360,460),
at least one diversion flow path (270,370,470) for diverting a flow of excess superheated steam from said closed regeneration loop (240,340,440) to at least one process element of interest (280), said at least one process element of interest (280,380,480) being a heat exchanger (380) or a heat driven cooling unit (480);
wherein said closed regeneration loop is operated at a regeneration operating temperature of said superheated steam from 110° C. to 200° C.; and
wherein said at least one diversion flow path (270,370, 470) is comprised in said closed regeneration loop (240,340,440) downstream from said rotary desiccant wheel (210) but upstream from said at least one means for circulating superheated steam (250,350,450) and said at least one steam superheater (260,360,460).

2. A dehumidifier system (200,300,400) according to claim 1, wherein the flow direction of said superheated steam is countercurrent to the flow direction of said supply gas, wherefore said superheated steam circulating in said closed regeneration loop (240,340,440) will reach a regeneration section (214) of said rotary desiccant wheel (210) from said backside (216) of said rotary desiccant wheel.

3. A dehumidifier system (200,300,400) according to claim 1, wherein the flow direction of said superheated steam is co-current to the flow direction of said supply gas, wherefore said superheated steam circulating in said closed regeneration loop (240,340,440) will reach a regeneration section (214) of said rotary desiccant wheel (210) from said front side (215) of said rotary desiccant wheel.

4. A dehumidifier system (200,300,400) according to claim 1, further comprising a flush and heating flow path (230) for supplying a first flush gas to a flush and heating section (212) of said rotary desiccant wheel (210) and a flush and cooling flow path (235) for supplying a second flush gas to a flush and cooling section (212) of said rotary desiccant wheel (210).

5. A dehumidifier system (200,300,400) according to claim 4, wherein said first flush gas and said second flush gas are the same as said supply gas.

6. A dehumidifier system (200,300,400) according to claim 4, wherein said flush and heating flow path (230), and said flush and cooling flow path (235), are connected to form a unified flush flow path (236,237,336,337,436,437).

7. A dehumidifier system (200,300,400) according to claim 1, comprising at least one further flush and heating flow path (230) and/or at least one further flush and cooling flow path (235).

8. A dehumidifier system (200,300,400) according to claim 1, wherein said rotary desiccant wheel (210) comprises a combination of adsorbents as a mixture or as alternating layers of two or more of said adsorbents.

9. A dehumidifier system (200,300,400) according to claim 1, wherein the regeneration operating steam pressure of said superheated steam is from 1 bar to 5 bars.

10. A dehumidifier system (200,300,400) according to claim 1, wherein the temperature of said supply gas upon entry into said rotary desiccant wheel (210) is from 20° C. to 50° C.

11. A dehumidifier system (200,300,400) according to claim 1, further comprising at least one underpressure section (590,591,592,593,594).

12. A dehumidifier system (300) according to claim 1, wherein excess superheated steam from said closed regeneration loop (340) for superheated steam regeneration of said rotary desiccant wheel (210) is diverted from said closed regeneration loop (340) along said diversion flow path (370) to said at least one process element of interest (380), said at least one process element of interest (380) being a heat exchanger (380), comprised in said closed regeneration loop (340); and wherein said diversion flow path (370) comprises at least one compressor (381) for compressing in at least one compression step said excess superheated steam prior to entering said heat exchanger (380).

13. A dehumidifier system (400) according to claim 1, wherein excess superheated steam from a closed regeneration loop (440) for superheated steam regeneration of a rotary desiccant wheel (210) is diverted from said closed regeneration loop (440) along a diversion flow path (470) to at least one heat driven cooling unit (480*a*, 480*b*) located either upstream (480*a*) or downstream (480*b*) of said rotary desiccant wheel (210) in a gas flow path (220,230,235).

14. A dehumidifier system, comprising a first dehumidifier system (200,300,400) according to claim 1, said first dehumidifier system (200,300,400) comprising a closed regeneration loop (240,340,440) for regenerating a rotary desiccant wheel (210) using superheated steam, and at least a second dehumidifier system, said second dehumidifier system comprising at least one second rotary desiccant wheel, said at least one second dehumidifier system not comprising a closed regeneration loop for regenerating said at least one second rotary desiccant wheel using superheated steam, wherein said first dehumidifier system (200,300,400) and said at least a second dehumidifier system are arranged sequentially on a supply gas flow path (220) with said first dehumidifier system (200,300,400) arranged upstream (221) of said at least one second dehumidifier system on said supply gas flow path (220).

* * * * *